(No Model.)
J. C. SCHUMAN.
METHOD OF PREPARING AND TREATING STARCH.
No. 379,034. Patented Mar. 6, 1888.
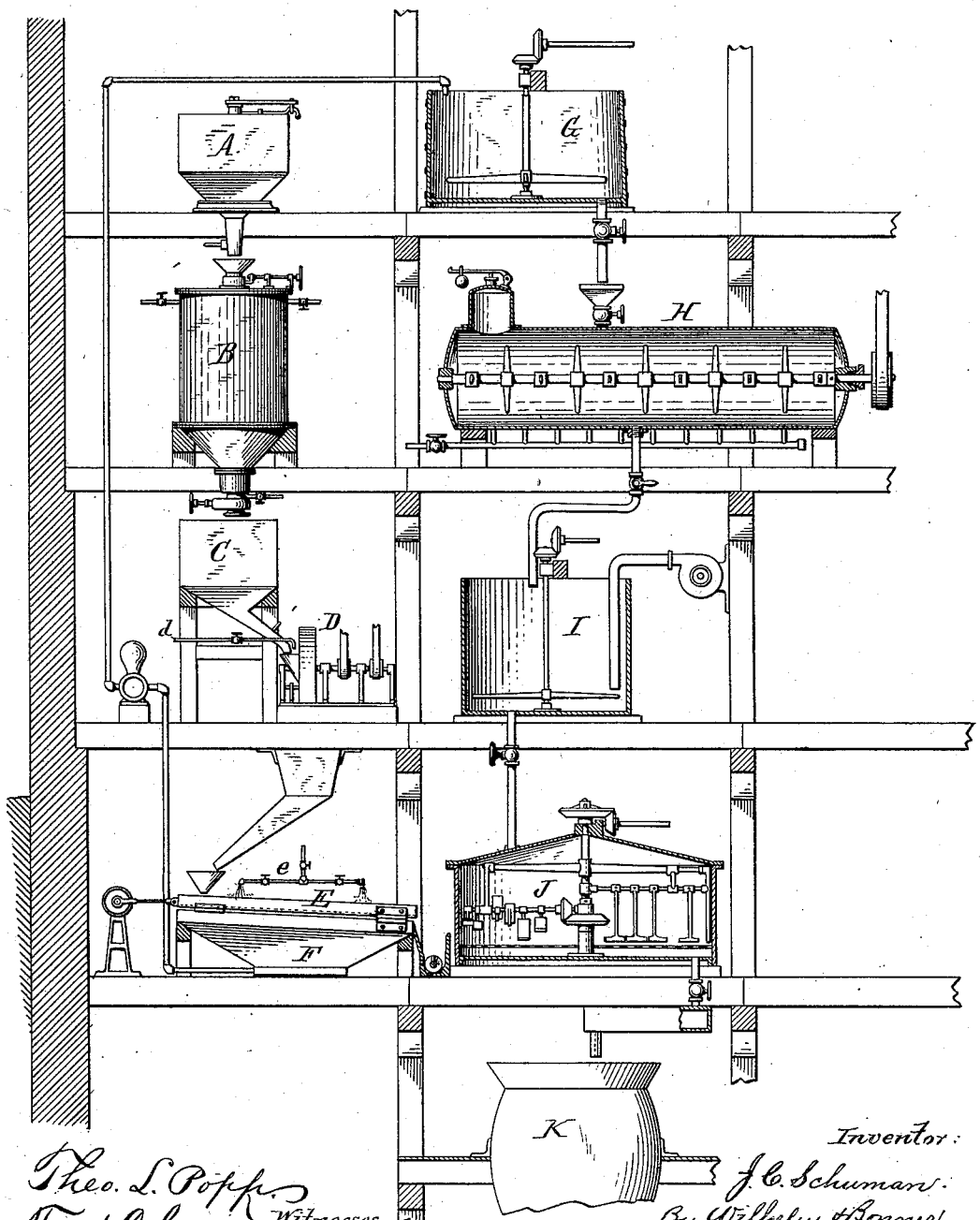

UNITED STATES PATENT OFFICE.

JOHN C. SCHUMAN, OF AKRON, ASSIGNOR TO WILLIAM T. JEBB, OF NEW YORK, N. Y.

METHOD OF PREPARING AND TREATING STARCH.

SPECIFICATION forming part of Letters Patent No. 379,034, dated March 6, 1888.

Application filed August 11, 1887. Serial No. 246,649. (No specimens.)

*To all whom it may concern:*

Be it known that I, JOHN C. SCHUMAN, of Akron, in the county of Erie and State of New York, have invented a new and useful Improvement in the Method of Preparing and Treating Starch, of which the following is a specification.

This invention relates to the manufacture of beer and ale from malt and the starch extracted from Indian corn or maize.

The object of this invention is the preparation and the subsequent utilization of the starch of Indian corn or maize in the process of brewing in a simple and inexpensive manner and without imparting to the malt liquor any of the objectionable extractive matters contained in the hulls, germs, and glutinous layers of the kernels of corn.

In practicing my invention the corn is first steeped in water in a suitable vat or tank at a temperature of about 140° Fahrenheit for about fifteen hours. This temperature is preferably maintained in the steep vat or tank by renewing the water from time to time from a tank containing hot water. The steep vat or tank is provided with a perforated false bottom for draining the steep-water from the corn. The temperature is preferably maintained below 155° Fahrenheit, as the starch-cells are liable to burst at this temperature, which renders the subsequent recovery of the starch difficult. When the steeping is completed, the water is drained off, the kernels having become sufficiently soft to permit of the separation of the starch from the hulls, germs, and gluten. The steeped corn is next reduced or comminuted in the presence of water by means of a suitable reducing-machine. I prefer to employ for this purpose a disintegrating-machine which operates by means of revolving beaters or pins; but any other suitable machine—such as a disk-mill, burr-mill, or roller-mill—may be employed, if desired. The starch is next separated from the husks, germs, and gluten by sifting. This is accomplished by a suitable sieve or screen, preferably a vibrating screen, upon which sprays of water are delivered, whereby the starch is washed through the cloth of the screen, while the coarse offal, consisting of hulls, germs, and gluten, escapes over the tail of the screen. The starchy liquid which is so obtained is collected in a suitable vat, which is preferably provided with an agitator or stirrer, whereby the starch may be prevented from settling, if desired. The starchy product, after being increased in gravity by subsidence and the drawing off of the supernatant water, or without being subjected to such treatment, is then developed in a suitable tank which is heated by steam to the desired temperature. By the term "developing" I mean subjecting the starch to the action of heat and water at a sufficiently high temperature to burst the starch-cells and diffuse the starch in the water, so that the starch can be thoroughly acted upon by the diastase in the subsequent conversion of the starch into sugar. This tank, termed a "developing-tank," is preferably a closed tank in which the operation of developing of the starchy product is conducted under a suitable steam-pressure; but, if desired, an open tank may be employed in which the operation is carried on under the pressure of the atmosphere. When a closed developing-tank is used, the starch liquid is preferably boiled in the same at a temperature of about 230° Fahrenheit, while when an open tank is used the temperature is maintained at about 210° Fahrenheit. If desired, a small quantity of malt may be added to the starch liquid in the developing-tank in order to prevent the starch from becoming too thick. When the starch has been developed to the desired degree, the same is discharged from the developing-tank into a suitable receiver, in which it is cooled to about 160° Fahrenheit. This cooling is preferably effected by a current of air blown into the receiver, whereby the temperature is rapidly reduced to the desired point at comparatively small expense and without materially changing the gravity of the liquid.

Cold water may be injected into the liquid for cooling the same; but in that case the liquid is diluted. The liquid may also be cooled by cold water circulating through a jacket or coil with which the receiver may be provided, but this operation is less speedy and more expensive.

The barley-malt is mashed in a suitable mash-tub in any suitable well-known manner, and the developed starch liquid is added to the mash in the mash-tub before the operation of mashing is completed, so that the developed starch becomes thoroughly commingled with the barley-malt, and is acted upon by the same during the operation of mashing. In preparing this compound mash the proportion of starch to barley-malt may be varied as the judgment of the operator may dictate, and in accordance with the requirements of the desired ultimate product. From twenty-five to seventy-five per cent. of the mixture may consist of this starchy material, reduced to dry weight, and from seventy-five to twenty-five per cent. barley-malt. When the mashing is completed, the wort is drained off, boiled in the usual way with hops, and cooled and fermented in any usual or suitable manner.

This process provides, ready for mashing, a liquid containing crude starch, which is substantially free from hulls, germs, gluten, and other impurities, and which is produced in so short a time that it remains sweet and is not tainted by fermentation. Neither does it contain any chemicals—such as alkalies and acids—which are usually employed in extracting starch from grain. The starch contained in this liquid becomes thoroughly hydrated or charged with water in extracting it from the grain, whereby it is fully prepared for the operations of developing and mashing, which are, in consequence, effected in less time than when dry starch is employed.

The accompanying drawing represents an apparatus which may be employed in practicing my invention.

A represents the weigh hopper or receptacle in which the corn is placed.

B represents the steep-tank which receives the corn from the hopper A, and which is provided with the necessary pipes and other appurtenances for supplying the steep with water and draining the water from the corn.

C represents a receiver which receives the corn from the steep-tank B.

D represents the reducing or comminuting machine which receives the steeped corn, and which is supplied with water by a pipe, $d$.

E represents the screen or sieve receiving the reduced material to be sifted. This sieve is provided with pipes $e$, by which sprays of water are delivered upon the sieve.

F represents the receiver which collects the starch liquid below the sieve, and G represents the tank or charger which receives the starch liquid preparatory to developing the same.

H represents the developing-tank into which the starch liquid passes from the tank G.

I represents the vat or tank which receives the developed starch liquid, and in which the same is cooled.

J represents the mash-tub in which the barley-malt is mashed together with the starch liquid, and K represents the kettle in which the wort is boiled.

It is obvious that the construction and arrangement of the apparatus may be varied without departing from the spirit of my invention.

I claim as my invention—

The herein-described process of preparing a wort suitable for the manufacture of beer and ale, which consists in steeping the corn, comminuting the corn with water, separating the starch liquid from the offal, developing the starch liquid by heat, cooling the starch liquid, mashing the developed starch liquid together with malt, and draining off the wort, substantially as set forth.

Witness my hand this 8th day of August, 1887.

JOHN C. SCHUMAN.

Witnesses:
JNO. J. BONNER,
FRED. C. GEYER.